United States Patent [19]

Iizuka et al.

[11] Patent Number: 4,884,961
[45] Date of Patent: Dec. 5, 1989

[54] APPARATUS FOR FORMING PLASTIC CONTAINERS

[75] Inventors: Takao Iizuka, Matsudo; Akiho Ota, Funabashi, both of Japan

[73] Assignee: Yoshino Kogyosho Co., Ltd., Tokyo, Japan

[21] Appl. No.: 137,948

[22] Filed: Dec. 28, 1987

Related U.S. Application Data

[60] Continuation of Ser. No. 934,789, Nov. 25, 1986, abandoned, which is a division of Ser. No. 760,548, Jul. 30, 1985, abandoned.

[51] Int. Cl.$^4$ .............................................. B29C 49/28
[52] U.S. Cl. ..................................... 425/195; 249/79; 249/80; 249/104; 425/526; 425/387.1; 425/392
[58] Field of Search ..................................... 249/78–80, 249/150, 144, 151, 175, 176, 177, 112, 134, 135, 140, 142, 103, 111, 102–104; 425/526, 812, 387.1, 388, 392, 395, 195, DIG. 13

[56] References Cited

U.S. PATENT DOCUMENTS

| | | | |
|---|---|---|---|
| 476,649 | 6/1892 | Irwin | 249/103 |
| 2,054,553 | 9/1936 | Ballard | 249/103 |
| 2,266,831 | 12/1941 | Tegarty | 425/812 |
| 3,380,121 | 4/1968 | Chittenden et al. | 249/104 |
| 3,474,498 | 10/1969 | Hoppes | 249/103 |
| 3,550,197 | 12/1970 | Szajna et al. | 249/104 |
| 3,734,448 | 5/1973 | Rusk et al. | 249/103 |
| 3,784,344 | 1/1974 | Korsch | 425/387 |
| 4,034,036 | 7/1977 | Farrell | 264/530 |
| 4,035,455 | 7/1977 | Rosenkranz et al. | 264/40.3 |
| 4,036,927 | 7/1977 | Stolki | 264/97 |
| 4,087,227 | 5/1978 | Uhlig | 425/526 |
| 4,134,510 | 1/1979 | Chang | 215/14 |
| 4,151,250 | 4/1979 | Barry et al. | 264/532 |
| 4,206,171 | 6/1980 | Uhlig | 264/520 |
| 4,233,022 | 11/1980 | Brady et al. | 264/521 |
| 4,318,882 | 3/1982 | Agrawal et al. | 264/521 |
| 4,375,442 | 3/1983 | Ota et al. | 264/25 |
| 4,379,099 | 4/1983 | Ota et al. | 264/25 |
| 4,387,816 | 6/1983 | Weckman | 215/1 C |
| 4,411,610 | 10/1983 | Poppe et al. | 425/174.4 |
| 4,476,084 | 10/1984 | Takada et al. | 264/40.6 |
| 4,476,170 | 10/1984 | Jabarin | 528/272 |
| 4,482,518 | 11/1984 | Brady, Jr. | 264/535 |
| 4,493,633 | 1/1985 | Jakobsen et al. | 425/525 |
| 4,496,517 | 1/1985 | Kinoshita et al. | 264/521 |
| 4,572,811 | 2/1986 | Ota et al. | 264/25 |
| 4,589,559 | 5/1986 | Hayashi et al. | 264/25 |
| 4,590,021 | 5/1986 | Ota et al. | 264/25 |
| 4,594,204 | 6/1986 | Heidenreich et al. | 264/25 |
| 4,701,121 | 10/1987 | Jacobsen et al. | 425/526 |
| 5,524,045 | 6/1985 | Hayashi et al. | 264/521 |

FOREIGN PATENT DOCUMENTS

| | | | |
|---|---|---|---|
| 197607 | 6/1976 | Japan | 425/526 |
| 0014278 | 1/1980 | Japan | 264/327 |
| 5549554 | 11/1983 | Japan . | |
| 428950 | 11/1972 | U.S.S.R. | 425/552 |
| 1528512 | 11/1979 | United Kingdom . | |
| 2055672 | 3/1981 | United Kingdom . | |

OTHER PUBLICATIONS

"Gatorade Tests Bottle of Future", *Packaging*, 1987.

Primary Examiner—Willard Hoag
Attorney, Agent, or Firm—Oliff & Berridge

[57] ABSTRACT

Apparatus for forming a hollow blow-molded container utilizes a mold having at least one wall insert for forming a collapse panel in a container.

20 Claims, 3 Drawing Sheets

APPARATUS FOR FORMING PLASTIC CONTAINERS

This is a continuation of application Ser. No. 934,789 filed Nov. 25, 1986 which in turn is a division of application Ser. No. 760,548 filed July 30, 1985, both now abandoned.

BACKGROUND OF THE INVENTION

The present invention relates to a method and apparatus for forming hollow blow-molded containers of a biaxially oriented thermoplastic material, and more particularly to methods and apparatus for forming thin-walled plastic containers configured to accommodate partial evacuation without adverse effects on their appearance or strength.

Lightweight, thin-walled containers made of thermoplastic materials such as polyester resin and thermoplastic polymers containing at least 50% by weight polymerized nitrile-group-containing monomer (hereinafter "nitriles"), are well known in the container industry. For example, polyethylene terephthalate (PET) has a wide range of applications in the field of containers for foodstuffs, flavoring materials, cosmetics, beverages and so on. PET can be molded, by orientation-blowing, into transparent thin-walled containers having a high stiffness, impact strength and improved hygienic qualities with a high molding accuracy. Strong, transparent and substantially heat resistant containers may be produced by the biaxial-orientation blow-molding process in which a parison is oriented both laterally and longitudinally in a temperature range suitable for such orientation. Nitrile and heat-set PET containers are particularly heat resistant. Biaxially-oriented blow-molded containers have greater stiffness and strength as well as improved gas barrier properties and transparency.

When a thermoplastic container is filled with a hot liquid (such as a liquid sterilized at a high temperature) and sealed, subsequent thermal contraction of the liquid upon cooling results in a partial evacuation of the container which tends to deform the container walls. Backflow into a filling mechanism and the use of vacuum filling equipment during filling operations can similarly create a partial vacuum inside the container resulting in its deformation. Such deformation typically concentrates at the mechanically weaker portions of the container, resulting in an irregular and commercially unacceptable appearance. Further, if the deformation occurs in an area where the label is attached to the container, the appearance of the label may be adversely affected as a result of container deformation.

By increasing the wall thickness of the container it is possible to some extent to strengthen the container walls and thus decrease the effects of vacuum deformation. However, increasing the wall thickness results in a substantial increase in the amount of raw materials required to produce the container and a substantial decrease in production speed. The resultant costs are not acceptable to the container industry.

Prior art approaches have included the use of collapse panels to overcome thermal deformation; however, problems have developed in containers designed with large collapse panels. While large collapse panels accommodate a greater degree of controlled deformation, as the width of the collapse panel increases the strength of the container body decreases. Additionally, the wider the collapse panel the more difficult it is to mold the container. Wide collapse panels often distort when the container is removed from a heated mold in which they are formed.

As has been heretofore recognized, a thermoplastic container will have different degrees of molecular orientation along its axial dimension. During fabrication of the container a parison will be stretched in varying degrees to form the various sections of the container. For example, the portions of the parison forming the bottom and shoulder sections of the container will be stretched to a lesser extent than the portion of the parison forming the body section of the container. Also, the portion of the parison forming the body section of the container other than the collapse panel sections will undergo a slightly greater amount of stretching than the portion forming the collapse panels. That is, a greater amount of stretching will occur in the portion of the parison forming the outermost part of the body section of the container.

A prior attempt to reduce the effects of varying degrees of molecular orientation along a container's axial dimension is disclosed in U.S. Pat. No. 4,233,022 to Brady et al. Brady et al. discloses a method and apparatus for developing a strain crystallized morphology in thermoplastic containers by a heat treatment process subsequent to the blow-molding operation. This heat treatment process includes differentially heating the blow molded container along its length so that only those portions which have been significantly molecularly oriented are heat treated.

Thermoplastic containers having different degrees of molecular orientation along their axial dimensions must be fabricated in such a manner that the varying degrees of molecular orientation will not affect the physical strength, appearance or ease of manufacture of the container. The present invention is directed to a method and apparatus for effectuating the above mentioned requirements.

SUMMARY OF THE INVENTION

The present invention relates to a method and apparatus for forming hollow biaxial-orientation blow-molded containers with large collapse panels. More specifically, the method of the present invention comprises forming a blow-molded container in a mold having wall inserts on its inner wall surface. In a preferred embodiment, the container is heat-set in the mold, and the wall inserts are maintained at a temperature slightly lower than that of the remainder of the inner wall surface of the mold. In this preferred embodiment, the area of the container wall adjacent the mold wall insert (an area of the container which has undergone less stretching during fabrication) is heat set at a lower temperature than that at which the remaining sections of the container are heat-set. The apparatus of the present invention comprises a mold having an interior surface substantially conforming to the size and shape of the final blow-molded container, the inner surface of the mold being formed by at least one wall insert. Heating means may be provided to heat treat the blow-molded container. The wall insert preferably conducts less heat to the adjacent portion of the container than the remainder of the mold wall conducts to the remaining portions of the container body.

The method and apparatus of the present invention for forming a collapse resistant, molecularly oriented, thermoplastic container results in ready fabrication of containers having increased strength without the necessity of including additional supporting means in the container and also allows interchangeability of mold wall inserts without complete mold replacement.

DETAILED DESCRIPTION OF PREFERRED EMBODIMENTS OF THE INVENTION

Figure 1:
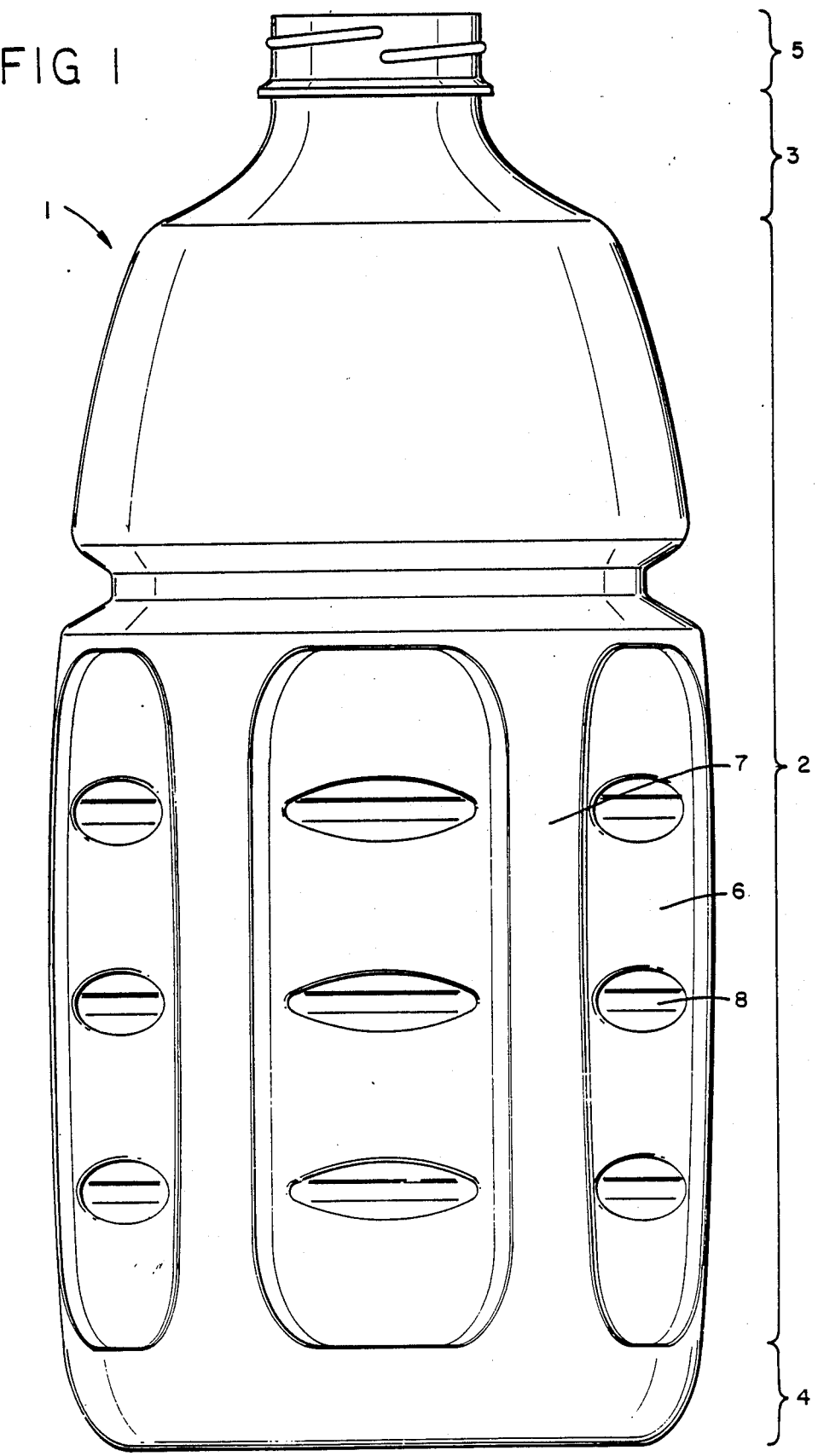
FIG. 1 is a side view of a container having collapse panels.

Referring now to the drawings, FIG. 1 depicts a thin walled blow-molded plastic container 1 formed by the method and apparatus of this invention. Container 1 may be formed of a hotfillable material (a material which safely permits filling of the container with contents at temperatures of 65°-100° C., more generally 75°-95° C.) such as polyethylene terephthalate (PET) or a nitrile. The container 1 comprises a body section 2 having a shoulder portion 3. The body section can be of any crosssectional shape, for example, polygonal such as rectangular, square, hexagonal or octagonal, or round. The lower end of the body section 2 is closed off by bottom section 4. The body section 2 extends upwardly from the bottom section 4 and the top of the body section 2 tapers radially inwardly to form the shoulder section 3 which terminates at a neck section 5. The neck section 5 may include external threads for a closure (not shown) and the neck section 5 may be crystallized to provide thermal, chemical and mechanical strength in the unstretched neck section as disclosed, for instance, in U.S. Pat. No. 4,379,099. The body portion 2 of the container is specifically configured to accommodate controlled changes of the volume of the container upon its partial evacuation. As shown in FIG. 1, indented collapse panels 6 are formed around the body section 2. A collapse panel 6 is preferably formed at each side of a polygonal body section 2, and adjacent collapse panels 6 are separated from each other by lands 7. The collapse panels may preferably contain reinforcing ribs 8.

Figures 2, 3, 4, 6:
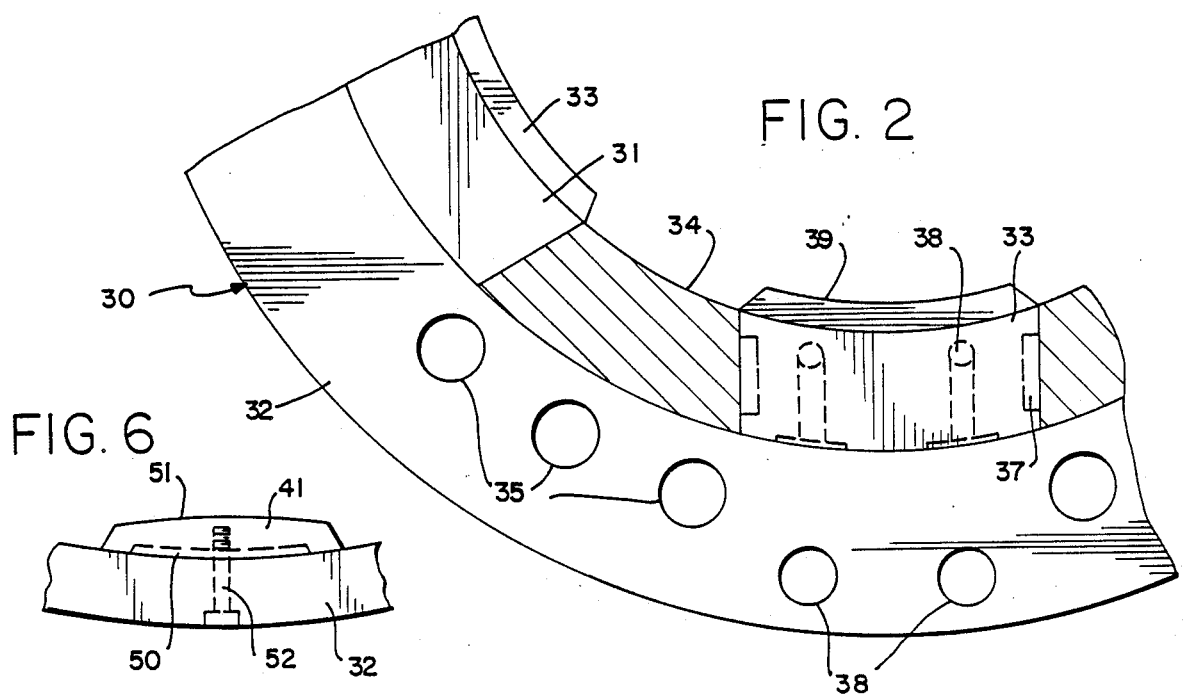
FIG. 2 is a top sectional view of a mold of the present invention.
FIG. 3 is a perspective view of a wall insert for the mold of the present invention.
FIG. 4 is a plan view of the insert of FIG. 3.
FIG. 6 is a top sectional view of another embodiment of the present invention.

The inventive method of forming the container 1 having collapse panels therein is described below. Conventional processes and apparatus for forming thin-walled plastic containers are known to those of ordinary skill in the art. In a conventional process, a parison is stretch blown into the final container shape in a mold. Referring to FIG. 2, the parison (not shown) is placed within a mold 30 which has an inner portion 31 and an outer portion 32. The inner portion 31 is formed by at least one wall insert 33 and at least one column 34. The column 34 may also comprise an insert member. The outer portion 32 of mold 30 may contain heating means therein, such as internal fluid ducts 35 connected to means for supplying heated liquid or gas to the internal ducts 35. The outer portion 32 may also contain air vents to vent air from between said parison and said mold during blowing. The wall insert 33 is so configured that when the parison is stretched to the final container shape against the internal surface of the mold, the wall insert 33 shapes the collapse panel in the container body 2. The wall insert 33 is preferably formed in such a way that the innermost surface 39 will have a temperature slightly lower than the temperature of the surface of the adjacent wall portion 34 when the mold is heated. The wall insert 33 is also preferably formed to permit venting of air through a gap around all or a portion of its edges and out through said air vents.

Various means to place a parison into a mold and for blowing the parison and heat treating the blown container are well known to those of ordinary skill in the art. According to an embodiment of the invention, the parison is blown to the final container shape and is heat-set in the mold. Heat is applied in such a manner that the collapse panel portions of the container are heated to a temperature about 10°-30° C., preferably 15°-25° C. less than the temperature of the remaining portions of the container, and the heating will be applied for 1-20 seconds, preferably 2-15 seconds. Since the final blown container will be less stretched at the portions corresponding to the collapse panels, the invention contemplates reducing the effects of varying degrees of stretching in the container body by controlling the heat-setting temperatures.

The wall inserts may be interchanged to form different size and shape collapse panels in the final blown container. For instance, the wall insert may include projections which conform to the shape of reinforcing ribs 8 in the collapse panel. Alternatively, the wall insert may slope longitudinally outwardly into the mold cavity towards a longitudinally central transverse line 53, thus to form a collapse panel which slopes longitudinally inwardly to a transverse reinforcing line as shown in FIG. 3. A technician need only substitute a different wall insert into the mold 30 to form a new surface pattern on the container.

The apparatus of the present invention will now be more fully described. The mold 30 includes an outer portion 32 with internal ducts 35 therein. The mold 30 also includes inner portion 31 formed of at least one wall portion 34 (which may also comprise an insert) and at least one wall insert 33 described above. The wall portion 34 may be made of stainless steel or any other conductive material. The wall insert 33 may be made of aluminum or an insulating material which reduces the heat transfer from the outer portion 32 and wall portion 34 of the mold 30 to the wall insert 33. Alternatively, or additionally, the wall insert 33 may contain internal cooling ducts or channels 36 which allow cooling fluids to flow through the wall insert to reduce the heat of the inner surface 39 of the wall insert 33. These cooling channels 36 may be connected to a source of cooling fluid through ducts 38 in the mold wall. The wall insert 33 may also include one or more cutout sections 37 which provide insulating space to reduce heat transfer between the outer portion 32 of the mold 30 and the wall insert 33, and/or between the wall portion 34 and the wall insert 33.

A perspective view of a preferred wall insert 33 is illustrated in FIG. 3, which more clearly shows the cooling channels 36 and the cutout sections (elongated recessed side portions, upper and lower cut-out portions) 37. FIG. 4 is a plan view of the wall insert 33 of FIG. 3. In a preferred embodiment, the wall insert 33 may have an anodized surface and be formed of aluminum.

Figure 5:
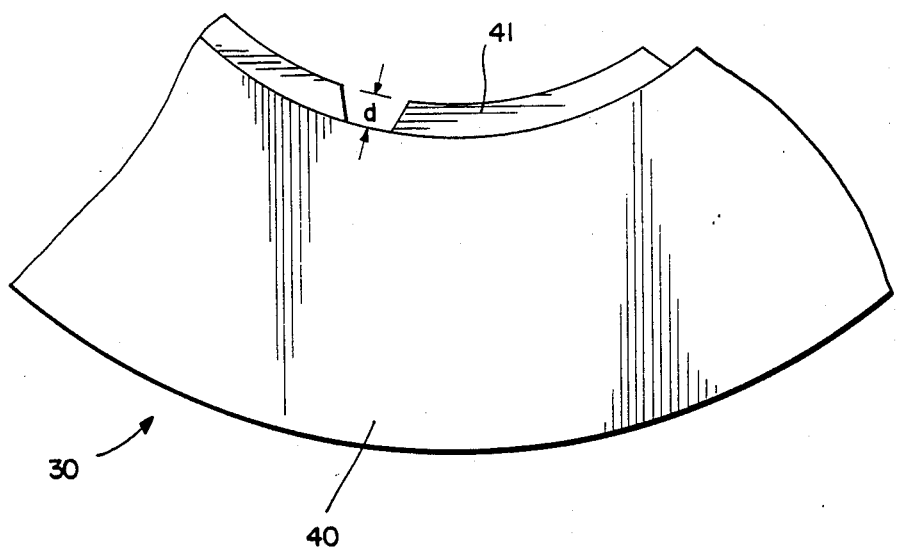
FIG. 5 is an enlarged top sectional view of another embodiment of the present invention.

In another alternative embodiment shown in FIG. 5, in which like reference numerals depict like features, the mold 30 includes a first portion 40 defining the interior cavity and at least one wall insert 41 attached to the first portion 40 at positions corresponding to the collapse panels in the container 1. The wall insert 41 preferably has a depth d corresponding to the depth of the collapse panel or other indentation to be formed in the container. The various alternative embodiments discussed above with regard to the larger wall insert 33 can also be utilized with the smaller wall insert 41. For example, as shown in FIG. 6, the smaller wall insert 41 can have a cutout section (recessed portion) 50 which increases its insulating ability. It is also realized that the small insert can have an anodized surface 51. The wall inserts may be connected to the outer portion 32 of the mold 30 by, for instance, bolts 52.

Various modifications and alterations of the present invention will be readily apparent to persons skilled in the art. It is intended, therefore, that the foregoing be considered as exemplary and that the scope of the invention be limited only by the following claims.

What is claimed is:

1. A blow-mold of a configuration suitable for forming a heat-set container including at least one elongated recessed panel section, comprising:
   plural mold members defining a mold cavity therebetween, and having at least one elongated removable insert member projecting from adjacent surfaces of said mold members for defining said panel section;
   said blow-mold having heating means for heating walls defining said mold cavity; and
   said insert member comprising means suitable for maintaining said insert member at a temperature above ambient but different from the temperature of said adjacent mold member surfaces, the back of said insert member adjacent one of said walls having a recessed portion to reduce heat transfer from said adjacent mold member surfaces to said insert member.

2. The blow-mold of claim 1, wherein said insert member is configured to define cut-out portions to further reduce heat transfer from adjacent mold member surfaces.

3. The blow-mold of claim 1, wherein said at least one insert member is changeable.

4. The blow-mold of claim 1, wherein said insert member is made of insulative material.

5. The blow-mold of claim 1, further comprising at least one air vent in said mold members behind at least one said insert member, said insert member being configured to allow air to pass around its edges to said air vent.

6. The blow-mold of claim 1, wherein a surface of said insert member facing said walls is spaced from said walls by said recessed portion.

7. The blow-mold of claim 1, wherein said at least one insert member is made of a material to further reduce heat transfer from adjacent surfaces of said mold members.

8. A blow-mold of a configuration suitable for forming a heat-set container including at least one elongated recessed panel section, comprising:
   plural mold members defining a mold cavity therebetween having a central axis, and having at least one elongated insert member projecting from adjacent surfaces of said mold members for defining said panel section, said insert member being removably attached onto surfaces of said mold members laterally of said central axis;
   said blow-mold having heating means for heating walls defining said mold cavity; and
   said insert member defining ducts extending therethrough for maintaining said insert member at a temperature above ambient but different from the temperature of said adjacent mold member surfaces.

9. The blow-mold of claim 8, wherein said insert member is configured to reduce heat transfer from said adjacent mold member surfaces to said insert member.

10. The blow-mold of claim 8, wherein said at least one insert member is changeable.

11. The blow-mold of claim 8, wherein said insert member is made of insulative material.

12. The blow-mold of claim 8, further comprising at least one air vent in said mold members behind at least one said insert member, said insert member being adapted to allow air to pass around its edges to said air vent.

13. The blow-mold of claim 8, wherein said at least one insert member is made of a material to reduce heat transfer from adjacent surfaces of said mold members to said insert member.

14. A blow-mold of a configuration suitable for forming a heat-set container including at least one elongated recessed panel section, comprising:
   plural mold members defining a mold cavity therebetween, and having at least one elongated removable insert member projecting from adjacent surfaces of said mold members for defining said panel section;
   said blow-mold having heating means for heating walls defining said mold cavity and comprising at least one air vent in said mold members behind at least one said insert member, said insert member being configured to allow air to pass around its edges to said air vent; and
   said insert member comprising means suitable for maintaining said insert member at a temperature above ambient but different from the temperature of said adjacent mold members surfaces.

15. The blow-mold of claim 14, wherein said insert member is configured to reduce heat transfer from said adjacent mold member surfaces to said insert member.

16. The blow-mold of claim 14, wherein said insert member comprises cooling ducts extending therethrough.

17. The blow-mold of claim 14, wherein said at least one insert member is changeable.

18. The blow-mold of claim 14, wherein said insert member is made of insulative material.

19. A blow-mold of claim 14, wherein said insert member is made of a material to reduce heat transfer from said adjacent mold member surfaces to said insert member.

20. A blow-mold of a configuration suitable for forming a heat-set container including at least one elongated recessed panel section, comprising:
   plural mold members defining a mold cavity therebetween, and having at least one elongated removable insert member projecting from adjacent surfaces of said mold members for defining said panel section;
   at least one air vent in said mold members behind at least one said insert member, said insert member being configured to allow air to pass around its edges to said air vent;
   said blow-mold having heating means for heating walls defining said mold cavity; and
   said insert member defining ducts extending therethrough for maintaining said insert member at a temperature above ambient but different from the temperature of said adjacent mold member surfaces.

* * * * *